United States Patent
Elson et al.

(10) Patent No.: US 10,532,629 B2
(45) Date of Patent: Jan. 14, 2020

(54) RADIANT HEATING SYSTEM INCORPORATING STEERING WHEEL POSITION MONITORING DEVICE

(71) Applicant: FORD GLOBAL TECHNOLOGIES, LLC, Dearborn, MI (US)

(72) Inventors: John Craig Elson, Bloomfield Township, MI (US); Kerrie Kathleen Gath, Pittsfield, MI (US); Clay Wesley Maranville, Ypsilanti, MI (US); Victoria Leigh Schein, Dearborn, MI (US); Donald Peter Schneider, III, Commerce Township, MI (US); Manfred Koberstein, Troy, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 219 days.

(21) Appl. No.: 15/696,427

(22) Filed: Sep. 6, 2017

(65) Prior Publication Data
US 2019/0070925 A1   Mar. 7, 2019

(51) Int. Cl.
*B60H 1/22* (2006.01)
*B60H 1/00* (2006.01)

(52) U.S. Cl.
CPC ....... *B60H 1/00742* (2013.01); *B60H 1/2218* (2013.01); *B60H 1/2225* (2013.01); *B60H 2001/224* (2013.01); *B60H 2001/2246* (2013.01); *B60H 2001/2259* (2013.01)

(58) Field of Classification Search
CPC .......... B60H 1/00742; B60H 1/2218; B60H 1/2225; B60H 2001/224; B60H 2001/2246; B60H 2001/2259; B60H 2001/00207; B60H 2001/00214

USPC ................. 237/5, 45, 70; 219/202
See application file for complete search history.

(56) References Cited

U.S. PATENT DOCUMENTS

| | | | | |
|---|---|---|---|---|
| 7,248,790 B2* | 7/2007 | Misumi | ............ | B60H 1/22 |
| | | | | 219/202 |
| 8,508,593 B1* | 8/2013 | Schofield | ............ | B60R 1/04 |
| | | | | 348/148 |
| 9,873,308 B2* | 1/2018 | Moench | ............ | B60H 1/00742 |
| 9,955,551 B2* | 4/2018 | Spero | ............ | B60Q 1/04 |
| 9,963,013 B2* | 5/2018 | Satzger | ............ | B60H 1/2218 |
| 2004/0194945 A1 | 10/2004 | Durach et al. | | |

(Continued)

FOREIGN PATENT DOCUMENTS

| | | |
|---|---|---|
| DE | 102011000177 A1 | 7/2012 |
| DE | 102014018416 A1 | 6/2015 |

(Continued)

OTHER PUBLICATIONS

English Machine Translation of DE102011000177A1.
English Machine Translation of DE102014018416A1.
English Machine Translation of KR20170002028A.

*Primary Examiner* — Gregory L Huson
*Assistant Examiner* — Daniel E Namay
(74) *Attorney, Agent, or Firm* — Vichit Chea; King & Schickli, PLLC

(57) ABSTRACT

A radiant heating system includes a radiant heating element, a steering wheel position monitoring device and a controller configured to control the radiant heating element in response to steering wheel position data received from the steering wheel position monitoring device. A method of controlling operation of a radiant system.

20 Claims, 11 Drawing Sheets

(56) References Cited

U.S. PATENT DOCUMENTS

| | | | |
|---|---|---|---|
| 2007/0114292 A1* | 5/2007 | Breed | B60H 1/00742 |
| | | | 236/49.3 |
| 2010/0130808 A1 | 5/2010 | Hattori | |
| 2014/0346160 A1* | 11/2014 | Moench | B60H 1/00742 |
| | | | 219/202 |
| 2015/0028116 A1* | 1/2015 | Satzger | B60H 1/2218 |
| | | | 237/5 |
| 2015/0028119 A1 | 1/2015 | Satzger et al. | |
| 2016/0200172 A1* | 7/2016 | Nakashima | B60H 1/2218 |
| | | | 237/5 |
| 2017/0080779 A1 | 3/2017 | Sagou et al. | |
| 2017/0368907 A1* | 12/2017 | Yoneda | G06K 9/00845 |
| 2018/0126821 A1* | 5/2018 | Moench | B60H 1/00742 |
| 2018/0251007 A1* | 9/2018 | Neveu | B60N 2/5678 |
| 2018/0297449 A1* | 10/2018 | Oide | B60H 1/2218 |
| 2019/0047367 A1* | 2/2019 | Elson | B60H 1/2218 |
| 2019/0047368 A1* | 2/2019 | Elson | B60H 1/2218 |
| 2019/0054798 A1* | 2/2019 | Nacer-Bey | B60H 1/00742 |
| 2019/0054801 A1* | 2/2019 | Elson | B60H 1/2218 |

FOREIGN PATENT DOCUMENTS

| | | | | | |
|---|---|---|---|---|---|
| GB | 2324864 B | | 1/1999 | | |
| JP | 2015083407 A | * | 4/2015 | | B60H 1/00285 |
| JP | 2017114198 A | * | 6/2017 | | B60H 1/00742 |
| JP | 2017128321 A | * | 7/2017 | | B60H 1/00742 |
| KR | 20170002028 A | | 1/2017 | | |

\* cited by examiner

RADIANT HEATING SYSTEM INCORPORATING STEERING WHEEL POSITION MONITORING DEVICE

TECHNICAL FIELD

This document relates generally to the motor vehicle equipment field and, more particularly, to a new and improved radiant heating system incorporating a steering wheel position monitoring device.

BACKGROUND

Radiant heating technology is beginning to be implemented in the motor vehicle field. Radiant heating panels provide heat through infrared radiation. Radiant heating panels work most efficiently when a maximum view factor is maintained between the radiant heating panel and the surface to be heated: that is when the radiant heating panel is normal to the surface to be heated.

Drivers of motor vehicles come in many shapes and sizes. Drivers adjust the position of the seat, headrest and steering wheel to desired positions when operating a motor vehicle. An intelligent radiant heating system is needed to adjust the spacial orientation or position of radiant heating panels in response to changes in a motor vehicle occupant's position in order to insure those radiant heating panels are positioned to provide efficient and effective heating.

This document relates to a new and improved radiant heating system including a controller configured to control the radiant heating element in response to steering wheel position data, seat position data and headrest position data so as to more efficiently and effectively deliver quick heating and thermal comfort to a driver of a motor vehicle regardless of the size and shape of that driver or the placement or position of that driver in the motor vehicle.

SUMMARY

In accordance with the purposes and benefits described herein, a radiant heating system is provided for efficiently and effectively providing heat and thermal comfort to a driver of a motor vehicle. That radiant heating system comprises a radiant heating element, a steering wheel position monitoring device, and a controller. The controller is configured to control the radiant heating element in response to steering wheel position data received from the steering wheel position monitoring device.

The radiant heating system may further include a seat position monitoring device. Additionally, the controller may be further configured to control the radiant heating element in response to seat position data received from the seat position monitoring device.

Still further, the radiant heating system may include a headrest position monitoring device. Additionally, the controller may be further configured to control the radiant heating element in response to headrest position data received from the headrest position monitoring device.

The radiant heating element may further include a position adjustment feature and the controller may be configured to control the position adjustment feature. In some embodiments, the radiant heating element may comprise a radiant heating panel. In some embodiments, the radiant heating element may comprise a radiant specular surface for reflecting infrared radiation from a radiant heating panel onto a target. In still other embodiments, the radiant heating element may comprise a plurality of radiant heating panels.

In accordance with an additional aspect, a method of controlling operation of a radiant heating element is provided. That method may comprise the steps of monitoring, by a steering wheel position monitoring device, positioning of a steering wheel and configuring a controller to control operation of the radiant heating element in response to steering wheel position data received from the steering wheel position monitoring device.

The method may further include the steps of monitoring, by a headrest position monitoring device, positioning of a headrest and configuring the controller to control operation of the radiant heating element in response to headrest position data received from the headrest position monitoring device.

The method may further include the steps of monitoring, by a seat position monitoring device, positioning of the seat and configuring the controller to control operation of the radiant heating element in response to seat position data received from the seat position monitoring device.

In addition the method may include the step of adjusting, by a position adjustment feature, positioning of the radiant heating element in response to control signals from the controller so as to warm hands on the steering wheel. Still further, the method may include the step of configuring the radiant heating element to include multiple radiant heating panels. In addition, the method may include the step of configuring the controller to selectively activate one radiant heating panel of the multiple radiant heating panels wherein that one radiant heating panel is best positioned to warm hands on the steering wheel.

In the following description, there are shown and described several preferred embodiments of the radiant heating system as well as the related method of controlling operation of a radiant heating element. As it should be realized, the radiant heating system and related method are capable of other, different embodiments and their several details are capable of modification in various, obvious aspects all without departing from the system and method as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the radiant heating system and related method and together with the description serve to explain certain principles thereof.

FIG. 3c is a block diagram of the control architecture for the radiant heating system illustrated in FIGS. 3a and 3b.

Reference will now be made in detail to the present preferred embodiments of the radiant heating system and related method of controlling operation of a radiant heating element, examples of which are illustrated in the accompanying drawing figures.

DETAILED DESCRIPTION

Figure 1A:
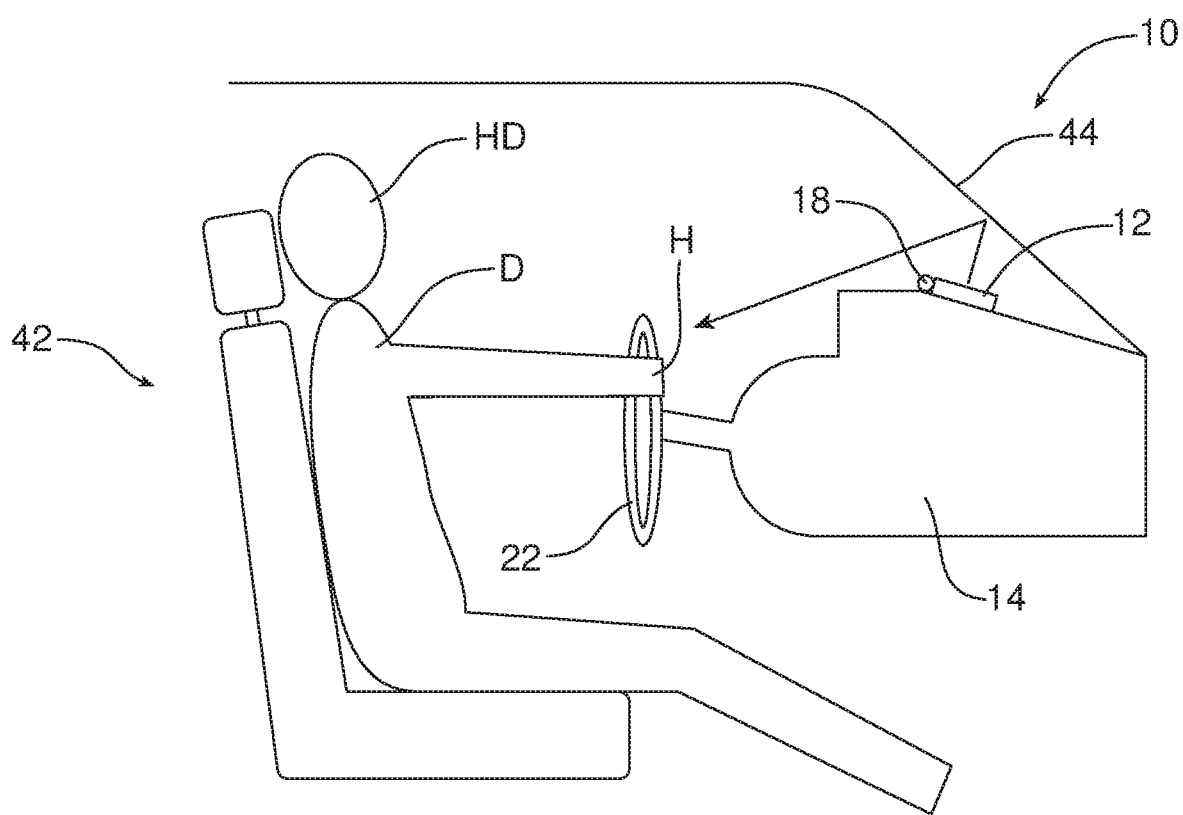
FIG. 1a is a schematic illustration of a first aspect of the radiant heating system and heating method wherein the steering wheel is in a first position.
Figure 1B:
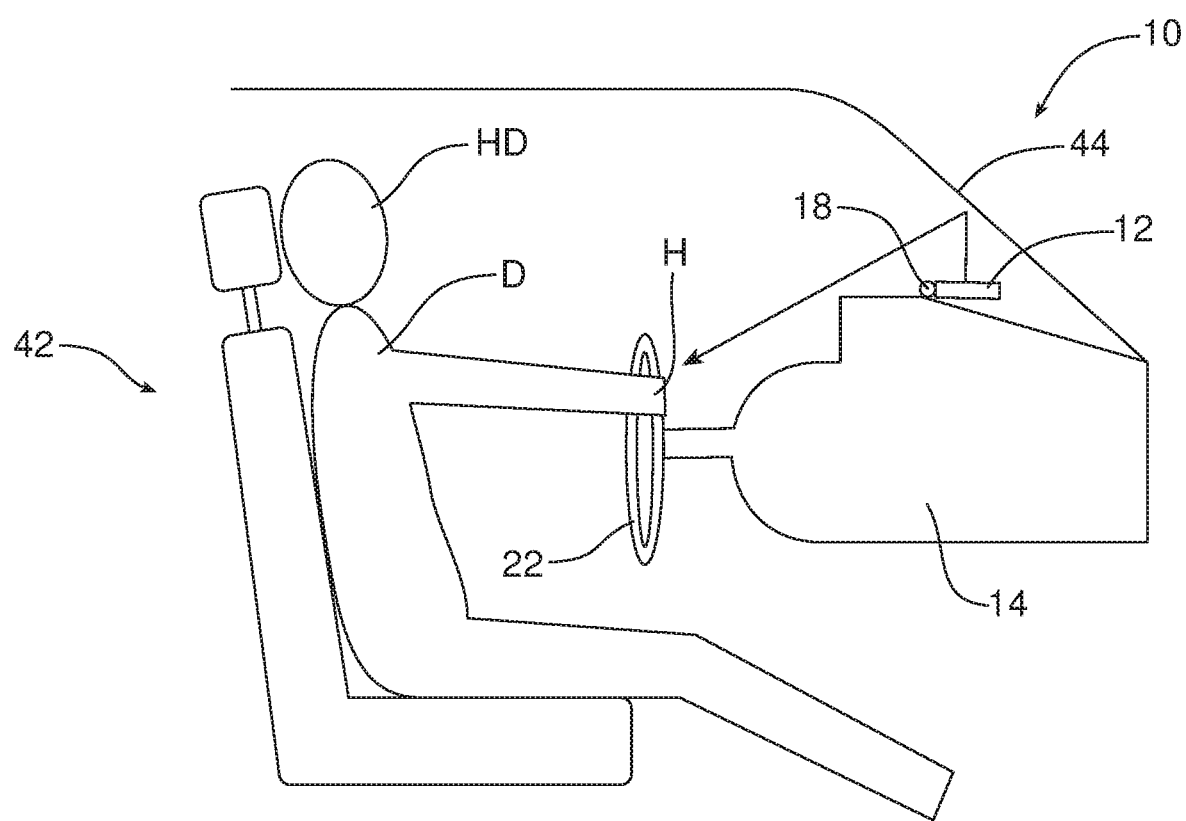
FIG. 1b is a view similar to FIG. 1a but illustrating the steering wheel in a second position and the responsiveness of the radiant heating system to heat the hands on the steering wheel in that second position.
Figure 1C:
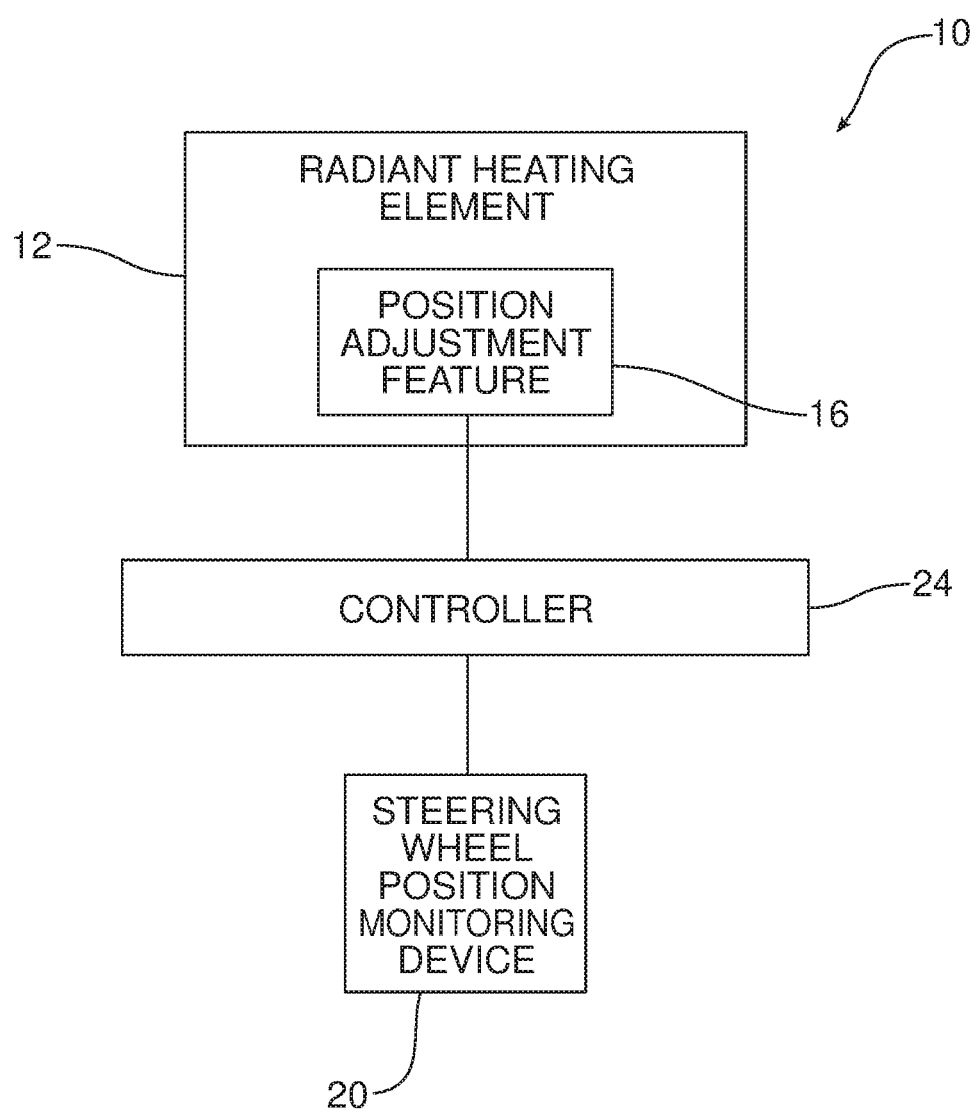
FIG. 1c is a schematic block diagram illustrating the control architecture of the radiant heating system illustrated in FIGS. 1a and 1b.

Reference is now made to FIGS. 1a-1d which illustrate a first aspect of the new and improved radiant heating system 10. The radiant heating system 10 comprises a radiant heating element 12 in the form of a radiant heating panel provided on the upper surface of the instrument panel 14 of a motor vehicle. As best illustrated in FIG. 1c, that radiant heating element includes a position adjustment feature 16 for displacing the radiant heating element 12 between different operating positions. The position adjustment feature 16 may comprise, for example, a linear actuator and the radiant heating element 12 may be pivoted about a hinge 18. Of course, such a structure should not be considered limiting in scope and it should be realized that the position adjustment feature 16 may comprise any suitable structure that functions to allow displacement of the radiant heating element 12 between different operating positions.

As further illustrated in FIG. 1c, the radiant heating system 10 may include a steering wheel position monitoring device 20 for monitoring the position of the steering wheel 22. That steering wheel position monitoring device 20 may take any form of position monitoring device useful for this purpose including, for example, linear position sensors including, but not limited to, technology based upon resistive, magnetoresistive, linear variable inductance transducers, linear variable differential transducers, Hall effect concepts and/or linearly dispersed electrical contacts. Rotational and angle sensors, including, but not limited to technology based upon Hall effect, magnetoresistive, resistive, optical, rotary variable inductance transducers, rotary variable differential transducer concepts and/or angularly dispersed electrical contacts may also be used.

As further illustrated in FIG. 1c, the radiant heating system 10 may also include a controller 24. The controller 24 is configured to control the radiant heating element 12 in response to steering wheel position data received from the steering wheel position monitoring device 20. More specifically, the controller 24 may comprise a computing device such as a dedicated microprocessor or an electronic control unit (ECU) operating in accordance with instructions received from appropriate control software. Thus, as illustrated in FIG. 1d, the controller 24 may comprise one or more processors 26, one or more memories 28 and one or more network interfaces 30 all in communication with each other over a communication bus 32.

Figure 1D:
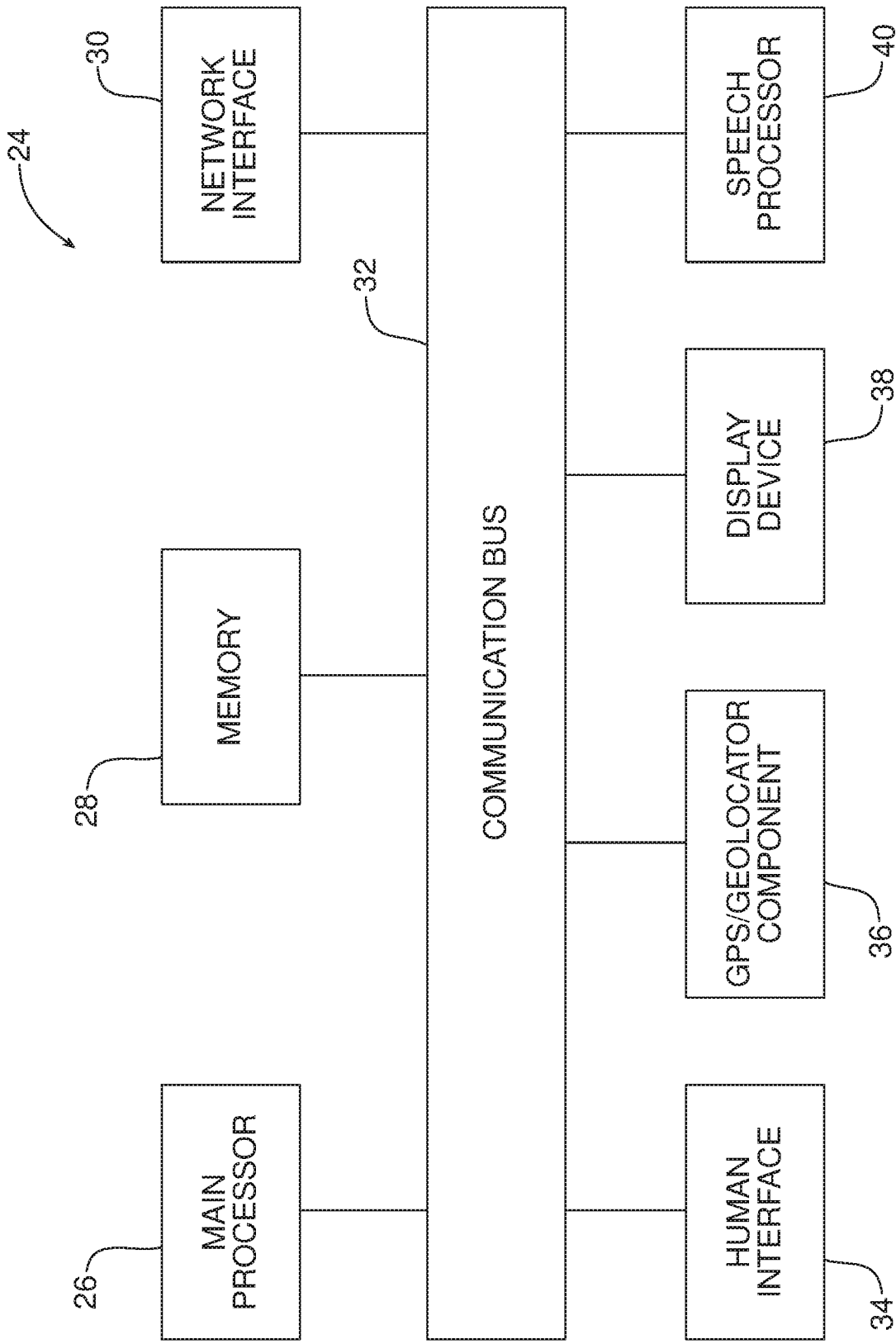
FIG. 1d is a schematic block diagram of a controller of the radiant heating system illustrated in FIG. 1c.

In some embodiments, the controller 24 may comprise a body control module or BCM which as illustrated in FIG. 1d, also incorporates a human interface 34, a GPS/geolocator component 36, a display device 38, such as a multifunction display with touchscreen and haptic feedback capability, and a speech processor 40 that all communicate with each other over the communication bus 32. The speech processor 40 provides the controller 24 with the ability to accept voice commands from the operator.

FIGS. 1a and 1b both illustrate a driver D sitting in a driver's seat 42 behind a steering wheel 22 projecting from the instrument panel 14. FIG. 1a illustrates that steering wheel 22 in a first position. FIG. 1b illustrates that steering wheel 22 in a second position.

The steering wheel position monitoring device 20 continuously monitors the position of the steering wheel 22. The steering wheel position monitoring device 20 provides steering wheel position data to the controller 24. The controller 24 responds to that steering wheel position data and controls the spatial orientation or positioning of the radiant heating element 12 in response to that data to ensure that heat from the radiant heating element is reflected off the windshield 44 onto the hands H of the driver D positioned on the steering wheel 22. Thus, as illustrated in FIG. 1a, the radiant heating element 12 is shown in a first position wherein infrared radiation from the radiant heating element reflects off the windshield 44 onto the hands H as they are positioned on the steering wheel in the first position.

Figure 2A:
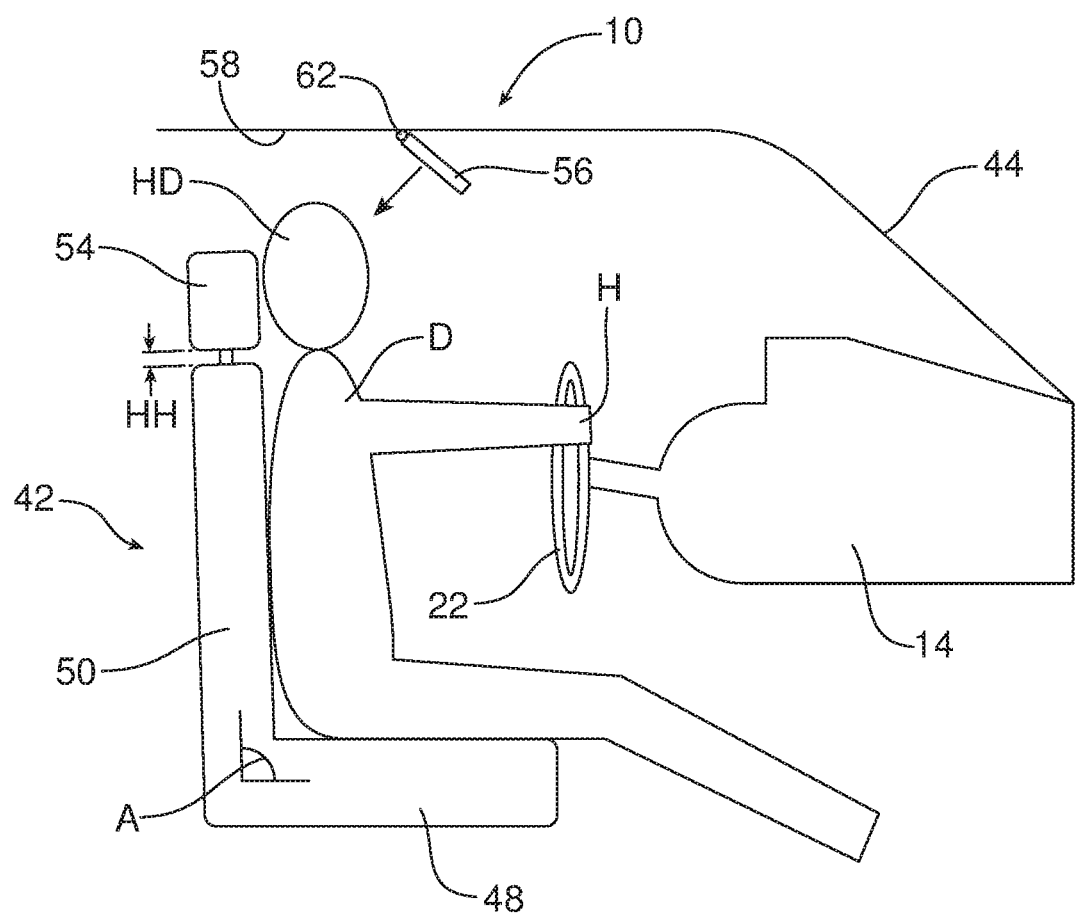
FIGS. 2a-2d are a series of schematic elevational views illustrating how the radiant heating system controls a radiant heating element in positions of the car seat and the headrest on that seat.
Figure 2B:
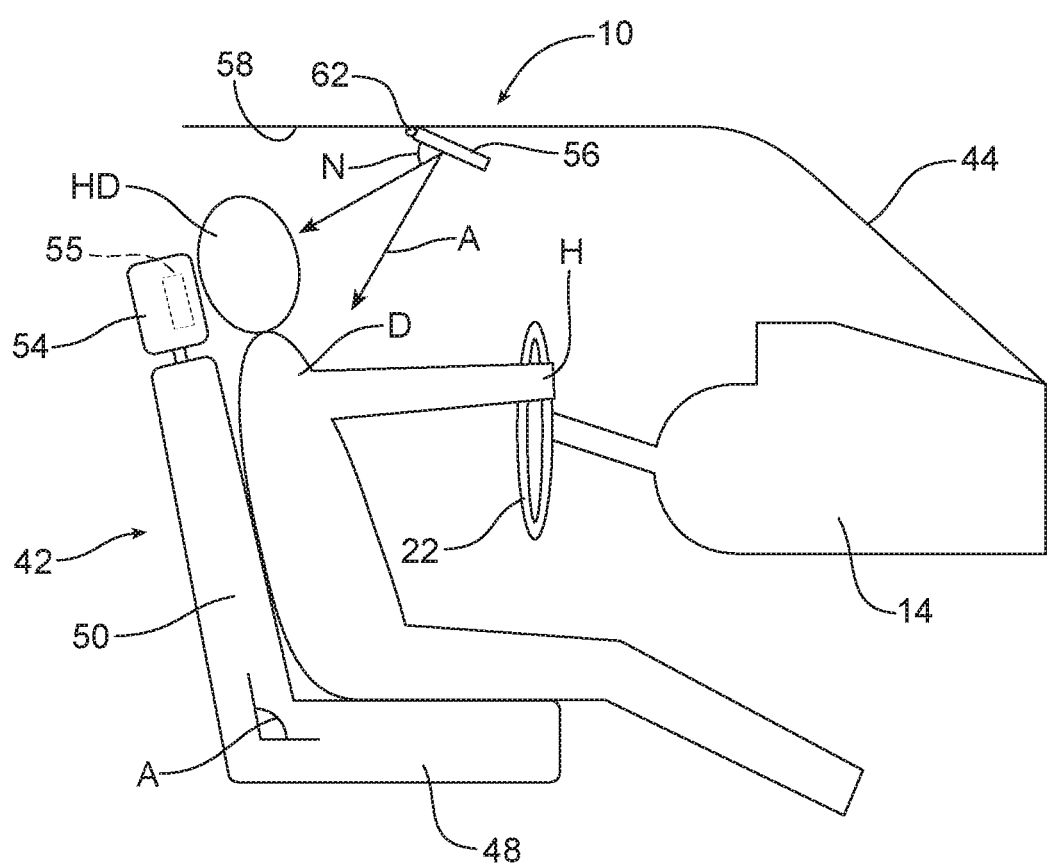

As illustrated in FIG. 2b, the steering wheel 22 is in a second position that is lower than the first position and closer to the driver than the first position. When the steering wheel 22 is moved into this second position, steering wheel data reflecting the new position of the steering wheel is provided by the steering wheel position monitoring device 20 to the controller 24. Controller 24 responds to this data by sending a control signal to the position adjustment feature 16 causing the radiant heating element 12 to be repositioned or reoriented to a second position. Warming infrared radiation from the repositioned radiant heating element 12 reflects off the windshield 44 toward the hands H of the driver D in the second position of the steering wheel 22 (see FIG. 1b). Thus, FIGS. 1a and 1b illustrate how the radiant heating system 10 adjusts to the positioning of the steering wheel 22 in order to most efficiently direct warming infrared radiation from the radiant heating element 12 to the hands H and maximize the comfort of the driver.

Reference is now made to FIGS. 2a-2b which illustrate an additional aspect of the radiant heating system 10. More specifically, as best illustrated in FIG. 2e, the radiant heating system 10 further includes a seat position monitoring device 46 for monitoring the position of the driver's seat 42. More specifically, the seat position monitoring device 46 monitors the position of the seat bottom 48 in the longitudinal direction of the motor vehicle. The seat position monitoring device also monitors the angular orientation A of the seat back 50 with respect to the seat bottom 48.

In addition, the radiant heating system 10 includes a headrest position monitoring device 52 that monitors the position of the headrest 54 provided on the seat back 50. In one of many possible embodiments, the headrest position monitoring device 52 monitors headrest height HH with respect to the top of the seat back 50. Further, the headrest 54 may include a pressure sensing device 55 to determine head height on the headrest.

The controller 24 is configured to control the radiant heating element 56 provided at the roof 58 of the motor vehicle in response to seat position data received from the seat position monitoring device 46 and headrest position data received from the headrest position monitoring device 52.

As further illustrated in FIG. 2e, the radiant heating system 10 also includes a position adjustment feature 60 for adjusting the position of the radiant heating element 56. In the illustrated embodiment, the position adjustment feature 60 is a linear actuator that adjusts the angular orientation of the radiant heating element 56 about the hinge 62. Here it should be appreciated that other position adjustment features known in the art could be utilized for this purpose.

FIG. 2a illustrates the driver D in the driver's seat 42 behind the steering wheel 22. As illustrated in FIG. 2a, the driver's seat 42 is in a first position with the seat back 50 forming an approximately 90 degree angle with the seat bottom 48 and the headrest 54 just slightly raised above the top of the seat back. The seat position monitoring device 46 provides seat position data to the controller 24 respecting the position of the driver's seat 42 including the longitudinal position of the seat bottom 48 and the angular position A of the seat back 50. The headrest position monitoring device 52 provides headrest position data respecting the extent the headrest 54 is raised above the top of the seat back 50. The controller 24 responds to this data by sending a control signal to the position adjustment feature 60 to adjust the angular orientation of the radiant heating element 56 about the hinge 62 so that infrared radiation emitted by the radiant heating element is directed toward the head HD of the driver D.

In FIG. 2b, the driver has adjusted the angular orientation A of the seat back 50 with respect to the seat bottom 48. Further, the steering wheel position has been adjusted in that it has been extended and raised. Angle N is the angle between the normal surface of the radiant heating element 56 and the target point or head HD of the driver D after the controller 24 has adjusted for the seat position data received from the seat position monitoring device 46 and the steering wheel position data received from the steering wheel position monitoring device 20.

As illustrated in FIG. 2b, initially, the controller 24 has incorrectly aimed the infrared radiation from the radiant heating element 56 toward the chest and neck area of the driver instead of the head HD (note action arrow A). This incorrect aiming of the radiant heating element 56 by the controller 24 is the direct result of the failure of the driver D to properly adjust the height of the headrest 54 for the new position of the driver's seat 42 and steering wheel 22. If the position of the headrest 54 were correct, the controller 24 would have oriented the radiant heating element 56 to the proper position for directing infrared radiation to the targeted area or head HD of the driver D.

Figure 2C:
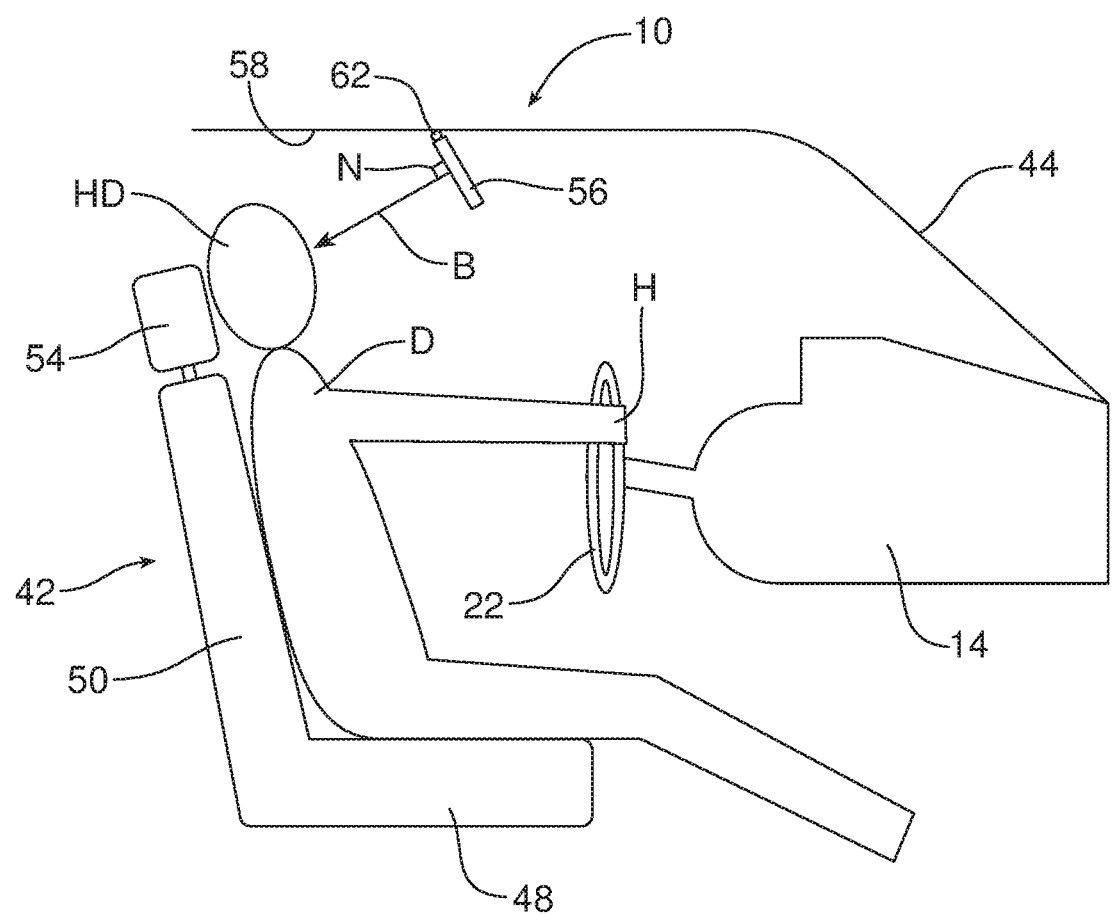

When the position of the radiant heating element 56 has not been properly adjusted, the driver D manually repositions the radiant heating element to direct the infrared radiation from the radiant heating element toward the desired target: the head HD of the driver (See FIG. 2c and note action arrow B).

Figure 2D:
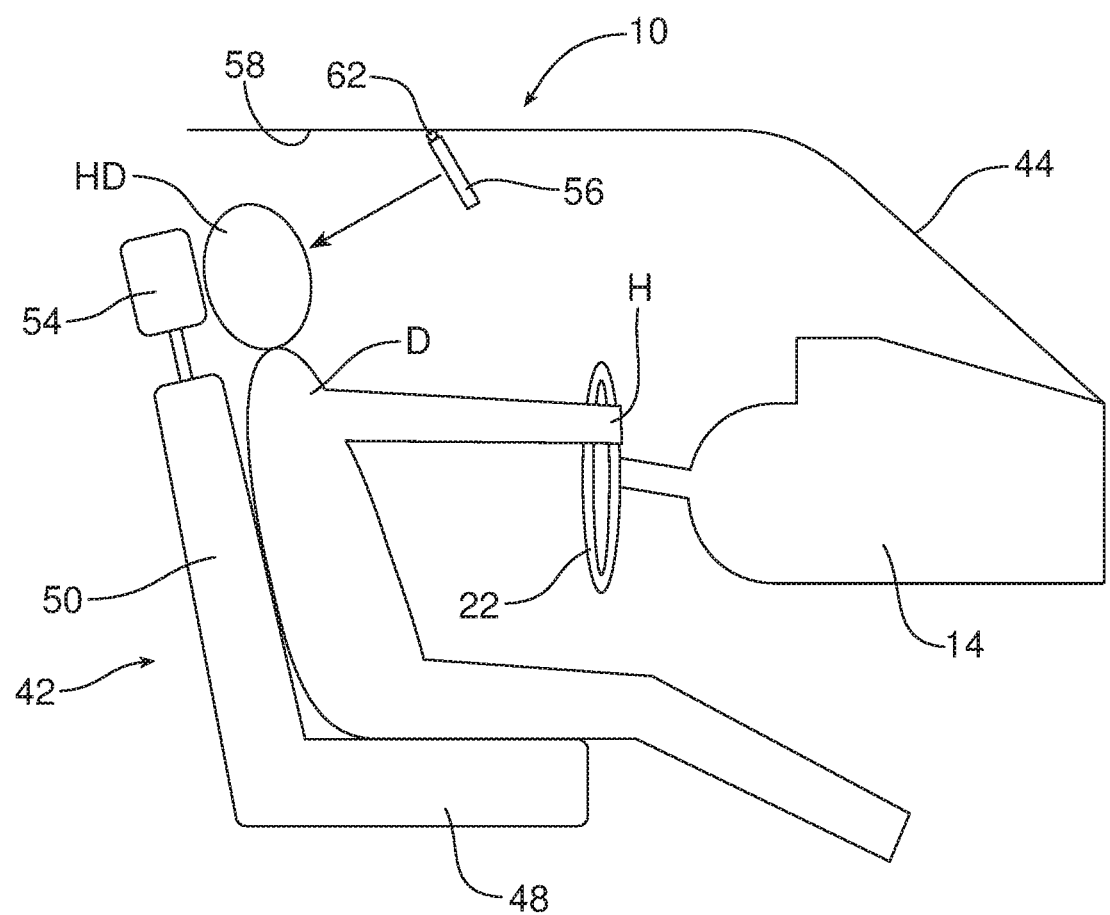
Figure 2E:
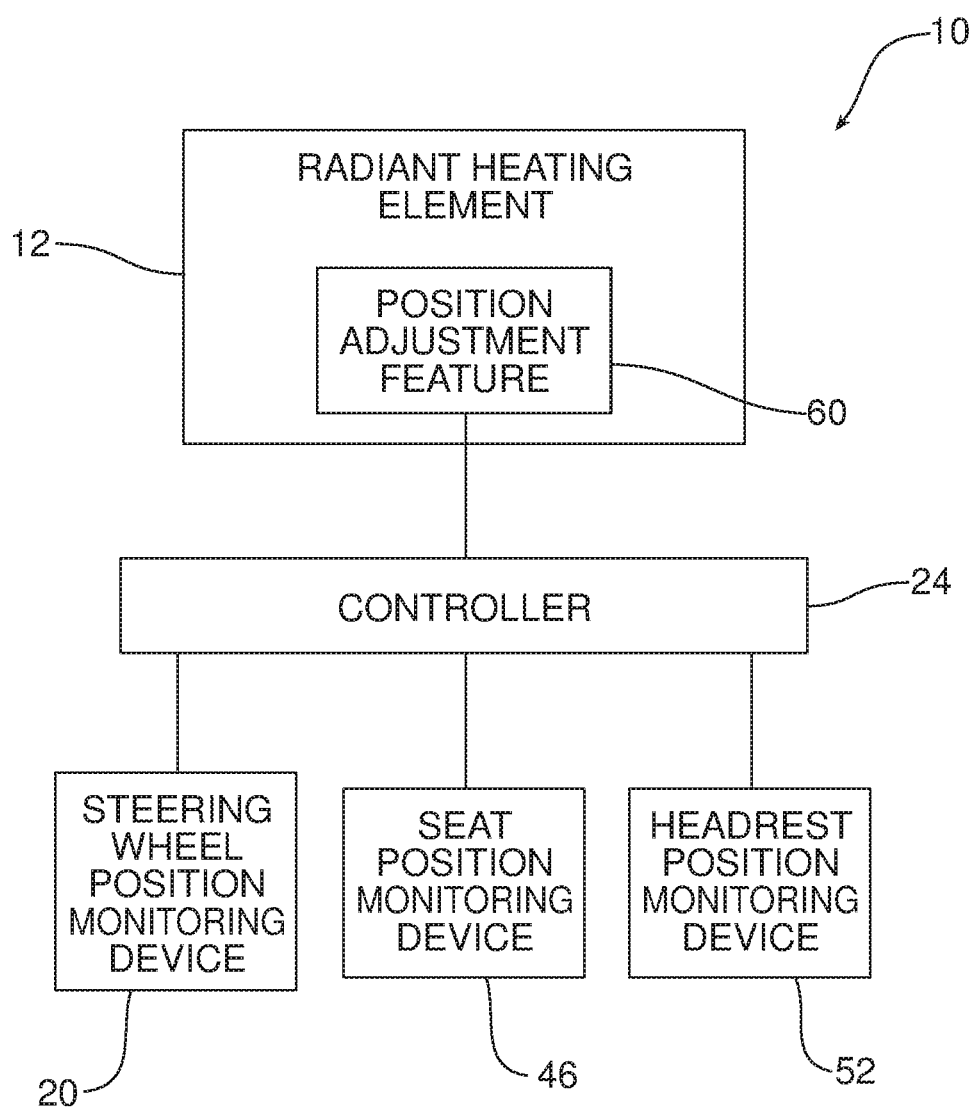
FIG. 2e is a schematic block diagram of the control architecture for the embodiment illustrated in FIGS. 2a-2d.

The controller 24 responds to this manual adjustment of the position of the radiant heating element 56 by prompting the driver D to check the height of the headrest 54 and adjust the headrest height for optimum safety at the next destination. In an alternative embodiment the controller 24 actually automatically adjusts the height of the headrest 54 in response to the data input. In embodiments where the controller 24 maintains and updates a profile for a particular driver D, the new positions for the driver's seat 42, headrest 54, steering wheel 22 and radiant heating element 56 are overwritten and maintained in memory for use when the driver D next enters and drives the motor vehicle. FIG. 2d illustrates the headrest 54 raised into the proper position.

Figure 3A:
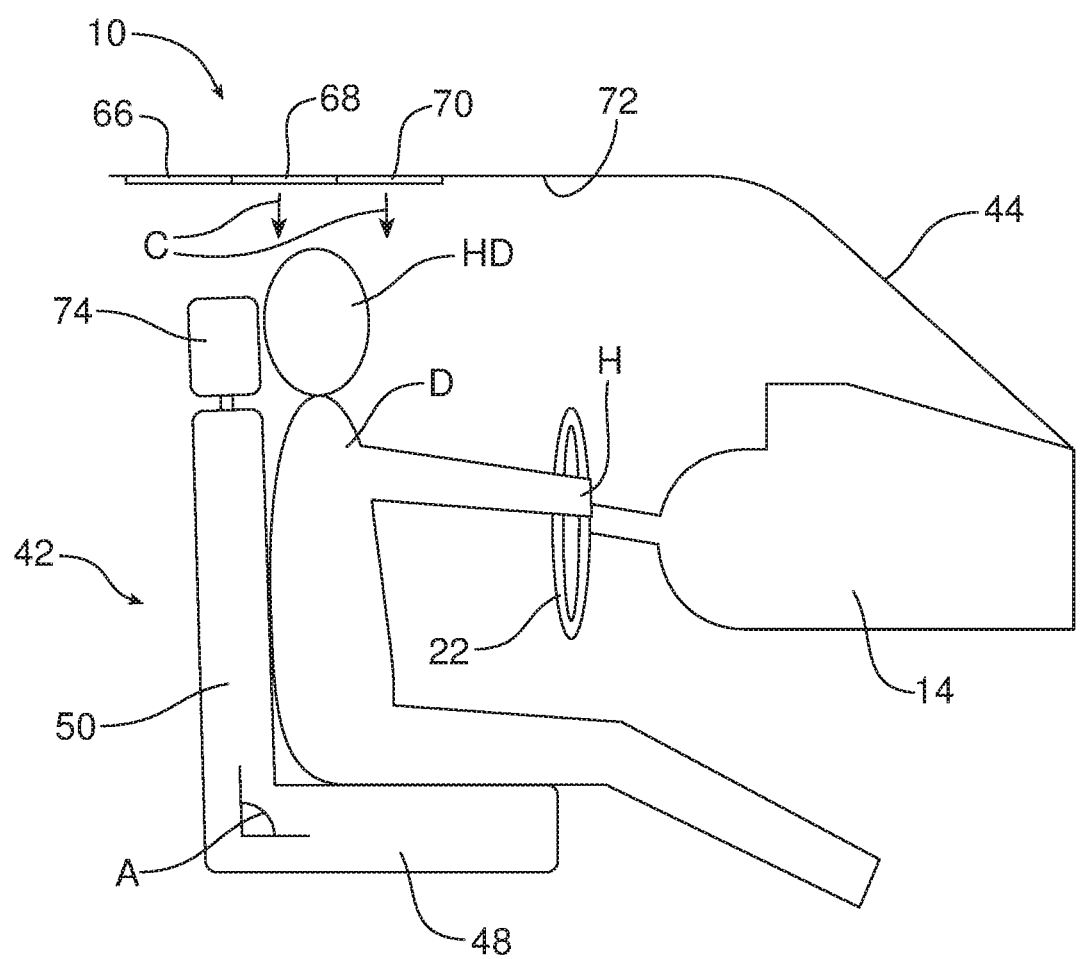
FIGS. 3a and 3b illustrate an alternative embodiment of radiant heating system incorporating a radiant heating element with multiple radiant heating panels.
Figure 3B:
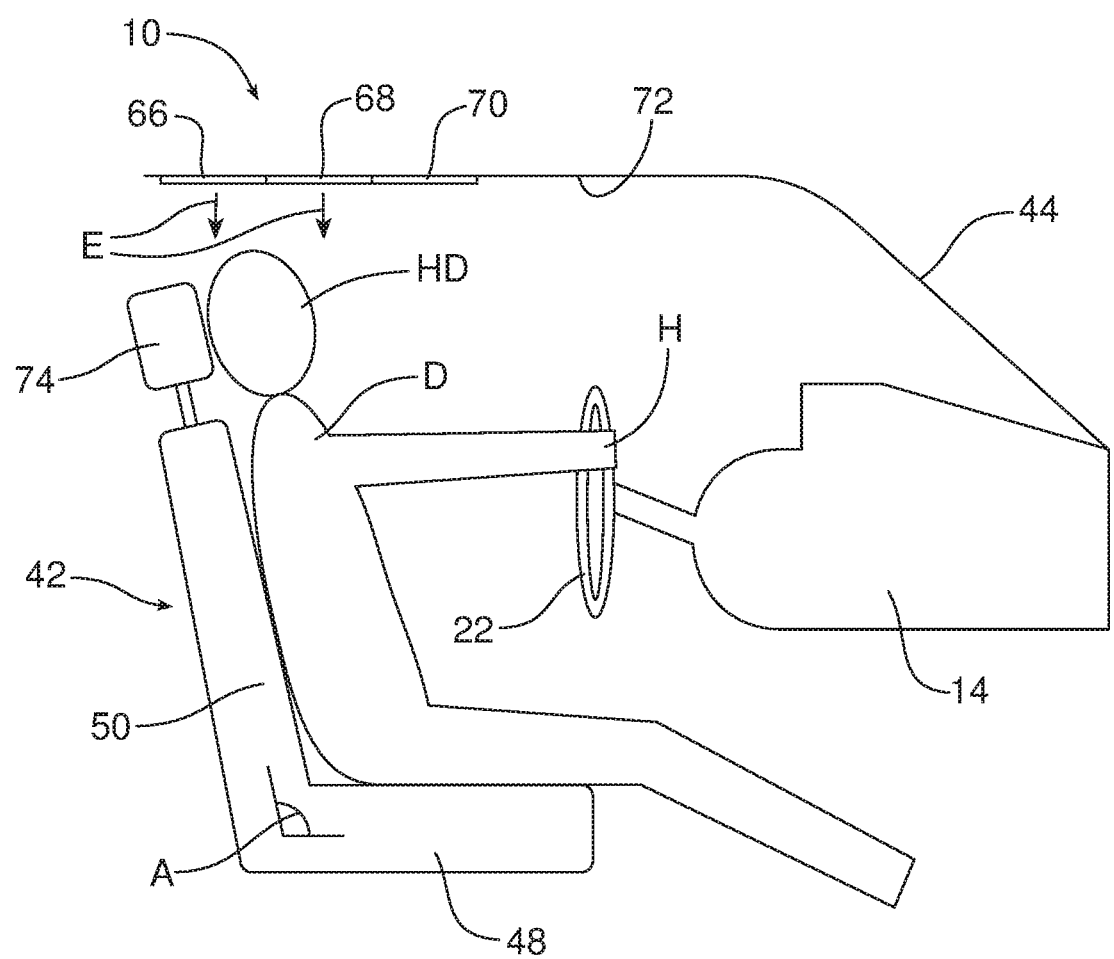

FIGS. 3a-3c illustrate an alternative embodiment of radiant heating system 10 wherein the radiant heating element 64 comprises a first radiant heating panel 66, a second radiant heating panel 68 and a third radiant heating panel 70.

As illustrated in FIGS. 3a-3b, the three radiant heating panels 66, 68 and 70 are positioned along the roofline 72 of the motor vehicle with the second radiant heating panel 68 positioned forward of the first radiant heating panel 66 and the third radiant heating panel 70 positioned forward of the second radiant heating panel 68. Thus, the third radiant heating panel 70 is closest to the steering wheel 22 of the motor vehicle.

FIG. 3a illustrates the driver D sitting in the driver's seat 42 behind the steering wheel 22 with the driver's seat 42, the headrest 74 and the steering wheel 22 all in a first position. The controller 24 receives steering wheel position data from the steering wheel position monitoring device 76, seat position data from the seat position monitoring device 78 and headrest position data from the headrest position monitoring device 80 (see FIG. 3c). The controller responds to that data by activating the second radiant heating panel 68 and the third radiant heating panel 70 of the radiant heating element 64 since those two panels are best positioned to direct infrared radiation to warm the head HD of the driver D and maintain the comfort of the driver in the most efficient manner (note action arrows C). Thus, in the first positioned illustrated in FIG. 3a, it should be appreciated that the first radiant heating panel 66 remains deactivated.

In FIG. 3b, the driver D has repositioned the driver's seat 42 by increasing the angle A formed between the seat bottom 48 and the seat back 50. Further, the headrest 74 has been raised from the top of the seat back 50. The seat position monitoring device 78 provides seat position data to the controller 24 reflecting the change in the position of the driver's seat 42. In addition, the headrest position monitoring device 80 provides headrest position data to the controller 24 reflecting the change in position of the headrest 74. The controller 24 responds to the new seat position data and headrest position data by activating the first radiant heating panel 66 and second radiant heating panel 68 of the radiant heating element 64 which are best directed to direct infrared radiation to heat the head HD of the driver D (note action arrows E). The third radiant heating panel 70 is now out of position for the most efficient heating of the head HD of the driver D and as such the third panel is deactivated by the controller 24.

As should be appreciated from a careful comparison of FIGS. 3a and 3b, the steering wheel 22 has also been repositioned. While not illustrated in FIGS. 3a and 3b for purposes of simplicity, it should be appreciated that as illustrated in FIGS. 1a and 1b, the steering wheel position monitoring device 20 would provide steering wheel position data indicative of this change in position of the steering wheel to the controller 24 and the controller 24 will respond by adjusting the position of radiant heating element 12 on the instrument panel 14 as necessary to properly warm the hands H of the driver D on the steering wheel. Thus, it should be appreciated that the aspects of the radiant heating system 10 illustrated in FIGS. 1a-1c may be combined with the aspects of the radiant heating system 10 illustrated in FIGS. 2a-2d and 3a-3b as desired to provide a radiant heating system that effectively targets the head HD and the hands H of the driver D on the steering wheel 22 no matter how positioned by the driver. An efficient heating of the head HD and hands H of the driver D delivers a quick sensation of warmth even on cold winter days before the air temperature within the interior of the motor vehicle has a chance to warm. Thus, the radiant heating system 10 provides a significant benefit and advantage appreciated by a motor vehicle operator.

In summary, the various embodiments of the radiant heating system 10 provide a number of benefits and advantages. The radiant heating system 10 provides quick heating to driver D of a motor vehicle improving thermal comfort. By providing more efficient and effective heating, the range of electric vehicles equipped with the radiant heating system 10 may be extended. Further, the radiant heating system 10 is capable of tailoring thermal comfort to the size, shape and position of the motor vehicle driver.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A radiant heating system, comprising:
    a radiant heating element;
    a steering wheel position monitoring device; and
    a controller configured to control said radiant heating element in response to steering wheel position data received from said steering wheel position monitoring device.
2. The radiant heating system of claim 1, further including a seat position monitoring device.
3. The radiant heating system of claim 2, wherein said controller is further configured to control said radiant heating element in response to seat position data received from said seat position monitoring device.
4. The radiant heating system of claim 3, further including a headrest position monitoring device.
5. The radiant heating system of claim 4, wherein said controller is further configured to control said radiant heating element in response to headrest position data received from said headrest position monitoring device.
6. The radiant heating system of claim 5, wherein said radiant heating element includes a position adjustment feature and said controller is configured to control said position adjustment feature.
7. The radiant heating system of claim 6, wherein said radiant heating element comprises a radiant heating panel.
8. The radiant heating system of claim 6, wherein said radiant heating element comprises a radiant specular surface.
9. The radiant heating system of claim 6, wherein said radiant heating element comprises a plurality of radiant heating panels.
10. The radiant heating system of claim 4, wherein said headrest further includes a pressure sensing device to determine head height on said headrest.
11. The radiant heating system of claim 1, wherein said radiant heating element comprises a plurality of radiant heating panels.
12. A method of controlling operation of a radiant heating element, comprising:
    monitoring, by a steering wheel position monitoring device, positioning of a steering wheel; and
    configuring a controller to control operation of said radiant heating element in response to steering wheel position data received from said steering wheel position monitoring device.
13. The method of claim 12, further including:
    monitoring, by a headrest position monitoring device, position of a headrest; and
    configuring said controller to control operation of said radiant heating element in response to headrest position data received from said headrest position monitoring device.
14. The method of claim 13, further including:
    monitoring, by a seat position monitoring device, position of a seat; and
    configuring said controller to control operation of said radiant heating element in response to seat position data received from said seat position monitoring device.
15. The method of claim 14, including adjusting, by a position adjustment feature, positioning of said radiant heating element in response to control signals from said controller so as to warm hands on said steering wheel.
16. The method of claim 14, including configuring said radiant heating element to include multiple radiant heating panels.
17. The method of claim 16, including configuring said controller to selectively activate one radiant heating panel of said multiple radiant heating panels wherein said one radiant heating panel is best positioned to warm hands on said steering wheel.
18. The method of claim 12, including adjusting, by a position adjustment feature, positioning of said radiant heating element in response to control signals from said controller so as to warm hands on said steering wheel.
19. The method of claim 12, including configuring said radiant heating element to include multiple radiant heating panels.
20. The method of claim 19, including configuring said controller to selectively activate one radiant heating panel of said multiple radiant heating panels wherein said one radiant heating panel is best positioned to warm hands on said steering wheel.

* * * * *